Nov. 22, 1927. 1,650,445
L. HAWKINS
INCUBATOR
Filed Sept. 4, 1926 2 Sheets-Sheet 2
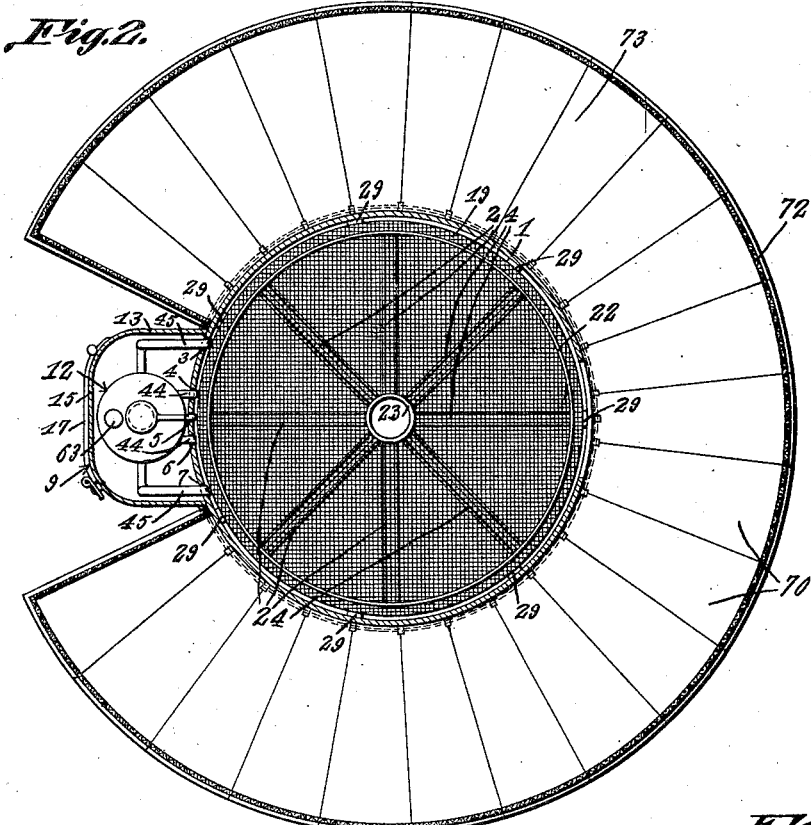
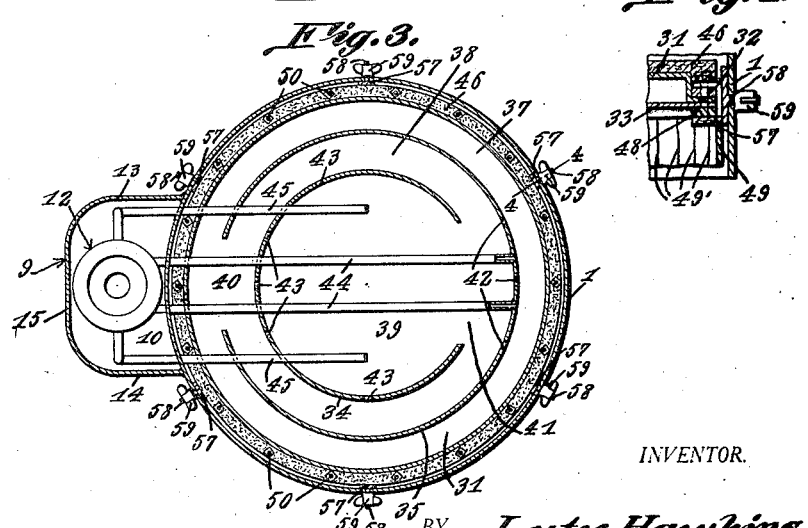
INVENTOR.
BY *Luty Hawkins,*
*Geo. P. Kimmel.*
ATTORNEY.

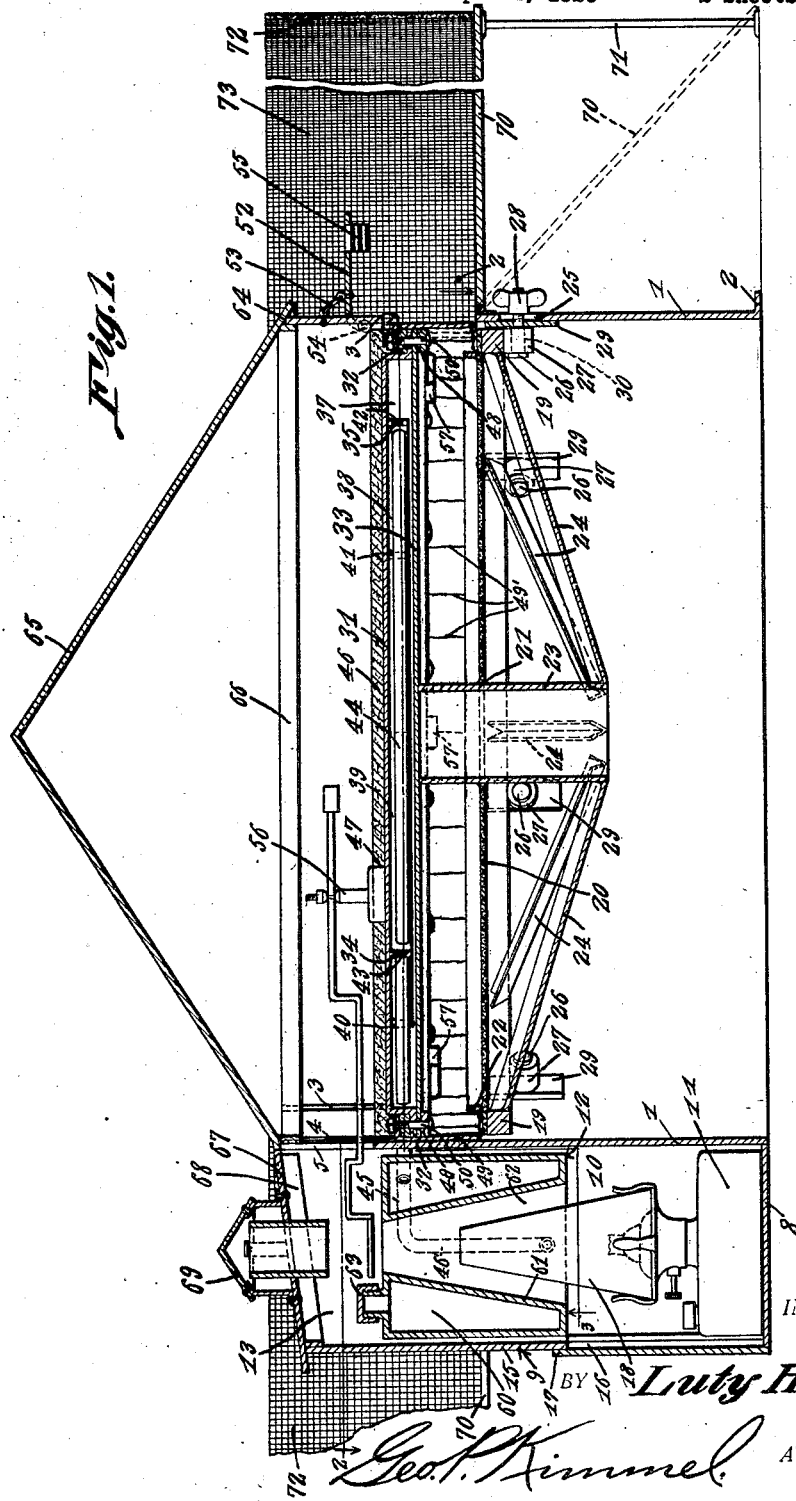

Patented Nov. 22, 1927.

1,650,445

UNITED STATES PATENT OFFICE.

LUTY HAWKINS, OF DIX, ILLINOIS.

INCUBATOR.

Application filed September 4, 1926. Serial No. 133,704.

This invention relates to an incubator device, and has for its object to provide, in a manner as hereinafter set forth, a device of the class referred to with means for applying heat directly to the eggs to expedite the hatching thereof.

A further object of the invention is to provide, in a manner as hereinafter set forth, an incubator with a vertically adjustable and revolubly supported tray to provide for the shifting of the eggs carried by the tray and further for the vertical adjustment of the tray relative to a heat applying element to prevent the latter exerting too much pressure on the eggs and chicks.

A further object of the invention is to provide, in a manner as hereinafter set forth, an incubator including a heater element for direct contact with the eggs and with the heater element so constructed and arranged to provide for a continuous circulation of the heating medium for the purpose of eliminating any dead space within said element.

Further objects of the invention are to provide, in a manner as hereinafter set forth an incubator which is comparatively simple in its construction and arrangement, strong, durable, compact, thoroughly efficient in its use, expeditious in its action, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a longitudinal sectional view of a device in accordance with this invention.

Figure 2 is a section on line 2—2 Figure 1.

Figure 3 is a section on line 3—3, Figure 1, on a reduced scale.

Figure 4 is a section on line 4—4, Figure 3.

An incubator device in accordance with this invention, comprises a circular housing of substantial height and diameter and which for a portion of its circumference is formed with an outwardly extending flange 2, at the bottom thereof, to provide a support. One side of the housing 1 is provided with a series of vertically extending slots 3, 4, 5, 6 and 7 which extend through the top edge thereof. The slot 5 is of less height than any one of the other slots, and the slots 3, 4, 6 and 7 are of the same height. The base of each of said slots is arranged above the transverse median of the housing 1. The purpose of the said series of slots will be hereinafter referred to.

Formed integral with that side of the housing 1 in which is provided the series of slots referred to is a laterally extending open top compartment forming element comprising a bottom forming portion 8, a combined outer and side wall forming portion 9. The portions 8 and 9, in connection with the housing 1 provide a compartment 10 for the reception of a heating element 11 and a water heater 12. The portion 9 provides a pair of side walls 13, 14 and an outer wall 15. The top edges of the side walls 13 and 14 incline upwardly from the outer wall 15 towards the top edge of the housing 1. The outer wall 15 is cut away to form an entrance opening 16 for the compartment 10 and which is normally closed by a hinged door 17. The opening 16 is arranged in the lower portion of the wall 15 and is of a size to permit of positioning the heater element 11 within the compartment 10 upon the bottom thereof. As shown by way of example, the heater element 11 is in the form of an oil lamp provided with a chimney 18 of tapering contour and which extends up into the water heater 12, but any suitable heater element can be employed.

Arranged within the housing 1, is a vertically adjustable and revolubly supported tray element for receiving the eggs to be hatched. The tray element comprises a metallic annulus or ring 19 having its body of appropriate thickness and preferably of square cross section. Mounted upon the upper face of the annulus 19, secured therewith and of the same diameter as the outer diameter thereof is a foraminous member 20 of appropriate mesh having formed axially thereof an opening 21 of appropriate diameter. Secured to the upper face of the member 20 is a vertically disposed annular rim 22 of a diameter less than the diameter of the member 20, but of a diameter to be positioned preferably in alinement with the inner side of the annulus 19 see Figure 1. The rim 22 is of appropriate height, and confines the eggs upon the member 20. Extending through the opening 21 as well as being secured to the member 20, is a tubular support 23 of appropriate diameter and which depends a greater distance below the member 20 than the distance which it extends above said member 20. Connected to the tubular support 23, at the lower end of the periphery thereof, is a series of radially disposed and upwardly inclined braces or spokes 24 having their upper ends secured in any suitable manner to the inner side of the annulus 19. Preferably each of the braces or spokes 24 is V-shaped in cross section, and acts as a bracing means for the tubular support 23. The function of the support 23 will be presently referred to.

Formed throughout the housing 1, and below the series of slots referred to, as well as positioned above the transverse median of the housing 1, is a series of vertically disposed spaced slots 25 of appropriate height; each is provided for connecting a revoluble supporting element to the housing and the said elements are employed for revolubly supporting the tray element. Each of the revoluble supporting elements consist of a headed bolt 26, carrying a roller 27 upon which the annulus 19 is mounted. The bolt 26 extends through a slot 25, projects laterally from the housing 1 and has threadably engaging with its projecting end a wing nut 28 for fixedly securing the supporting element in position. Mounted on the bolt 26 and interposed between the roller 27 and the inner face of each housing 1 is a flexible closure strip 29 for the slot 25 to prevent a draft entering the housing through a slot. The slots 25 also provide means for vertically adjusting the revoluble supporting elements for the purpose of elevating and lowering the tray element within the housing. The nuts 28 act as means for fixedly securing the supporting elements in adjusted position. That portion of the shank of each bolt 26, upon which is mounted the roller 27, is of greater diameter than that portion of the shank which extends through a strip 29, and said enlarged portion is indicated in dotted lines Figure 1 and designated 30. By this arrangement when a supporting element is clamped to the housing, the revolving of the roller 27 is not retarded.

Removably arranged within the housing 1, as well as supported stationary therein and in superposed relation with respect to the tray element is a combined egg contact and heating element. The said element when in active position is in direct contact with the top and one side only of the eggs for applying heat thereto, in a manner as when a hen is settting, under such conditions expediting the hatching and conducting the incubating operation in accordance with natural law. The combined egg contact and heating element comprises a heating medium container of circular contour which consists of an inverted pan 31 of appropriate height which has the lower end of the body portion thereof formed with an outwardly directed right angularly disposed annular flange 32 of an outer diameter substantially the same as the outer diameter of the annulus 19. The bottom of the pan 31 is closed by a resilient disk 33, preferably of rubber, but any suitable material pervious to heat can be substituted for the rubber. The disk 33 is of the same diameter as the flange 32 and abuts thereagainst. Formed integral with the inner face of the top of the pan 31 is a pair of concentric spaced heating medium guides 34, 35. The heating medium employed is hot water. Each guide is in the form of a split annulus and with the ends of each guide spaced an appropriate distance from each other. The open end of the guide 34 is oppositely disposed with respect to the open end of the guide 35. The guide 35 in connection with the body portion of the pan 31 provides a water passage 37. The guides 34 and 35 are arranged in spaced relation to provide a water passage 38 and the guide 34 forms what may be termed a water collecting chamber 39. The spaced ends of the guide 35 form an entrance 40 to the passage 38 and the spaced ends of the guide 34 form an entrance 41 to the chamber 40, see Figure 3. The guide 35 is formed with spaced openings 42 for establishing communication between the passages 37 and 38 and the guide 34 is provided with openings 43 for establishing communication between the passage 38 and the chamber 39. Connected to the guide 35 and opening into the passage 37 is a pair of hot water supply pipes 44. The pipes 44 extend to the guide 34, the entrance 40, through the body portion of the pan 31, through the housing 1 and into the compartment 10 and open into the upper end of the water heater 12. Communicating with the chamber 39 is a pair of cold water discharge pipes 45 which extend through the guides 34 and 35, as well as being secured therewith, and further extend through the body portion of the pan 31 and housing 1 and into the compartment 10. The pipes 45 at the ends which are arranged within the compartment 10 are extended downwardly as at 46, see Figure 1 and communicate with the lower end of the water heater 12. The pipes 44 and 45 provide for a circulation of the heating medium, hot water, through the combined egg contact and heating element.

The pan 31 is provided throughout the outer face thereof with a covering of insulation material as indicated at 46, which is provided with an opening 47 for a purpose to be presently referred to. Depending from the flange 32, as well as being secured therewith, is a heat confining member which has its lower portion normally surrounding the rim 22 and said heat confining member or element is in the form of a split annulus consisting of a sheet of felt 49 or other suitable material, secured as at 48 to the flange 32 and overhanging the edge of the latter. The sheet of felt 49 hangs down around the egg tray in the manner of a curtain. The sheet or strip of felt is split from its lower edge to the lower face of the flange 32, as at 49′. The splits 49′ are about one inch apart and permit the chicks to pass in and out at will to and from the tray. The disk 33 is held in position by a metal ring 58 and hold fast devices 50. The housing 1 is cut away to provide an opening which registers with the opening 51 and the opening formed in the housing is normally closed by a hinged door 52, see Figure 1 and by reference thereto the door 52 is shown in an elevated position and detachably connected in such position as at 53. The hinge for the door 52 is indicated at 54. The door 52 is provided with ventilators 55 which are in the form of strips of fabric carried by the lower portion of the door 52.

The pipes 44 extend through the slots 4 and 6, the pipe 45 extends through the slots 3 and 7 and extending through the slot 5 and seating in the opening 47 is a thermostatic controlling device 56 which also extends into the compartment 10 and is arranged over the water heater 12 and in the path of the heat directed by the chimney 18 of the heater element.

Arranged within the housing 1, and against the inner face thereof, is a series of angle-shaped supports 57 for holding the combined egg contact and heating element within the housing 1. Each support 57 is formed with a threaded shank 58 which extends through an opening in the housing 1 and carries a wing nut 59 on its outer end for the purpose of binding against the housing 1 to fixedly secure its associated support in a stationary position. The combined egg contact and heating element is removably mounted on the supports 57. The water heater 12 is bodily connected with the combined egg contact and heating element and when the latter is removed from the housing 1 the water heater 12 is carried therewith. The water heater 12, is in the form of a hollow annulus 60, formed with a conoidal shaped inner wall 61 which provides a tapered passage 62, which opens at the top and bottom of the water heater 12 and arranged over the top of the passage 62 is that end of the thermostat which is arranged within the compartment 10. The water heater 12 is provided with a normally closed filling opening 63.

The top edge of the housing 1 is beveled as at 64 and upon it is seated the removable cover 65 which is of conoidal contour and has secured to its inner face, adjacent its lower edge a ring 66 which engages the inner face of the housing 1 when the cover 65 is mounted upon the top of said housing. A cover 67 formed with a depending flange 68 provides a closure for the open top of the compartment 10. The cover 67 is provided with a vent device 69 for the compartment 10.

Disposed throughout the periphery of the housing 1 and extending from the wall 13 to the wall 14 is a series of hinged runways 70, which gradually increase in width from their hinged or inner ends towards their outer ends whereby when the run-ways are lowered, see dotted line position Figure 1, the run-ways will overlap. The run-ways are provided for the passage of the chicks from the device to the ground after the chicks are about a week old. In lieu of swinging the run-ways to the dotted line position shown in Figure 1, they may be supported in a horizontal position as shown in full lines in Figures 1 and 2 by vertical supports 71 only one of which is shown, and an open top cage 72 positioned above or rather upon the run-ways, when supported in a horizontal position, and when the door 52 is open the chicks can enter the enclosure 73 formed by the cage 72, horizontally disposed run-ways 70 and upper portion of the housing 1. The enclosure 73 is employed for feeding the chicks during the first week after they are hatched. The cage 72 is removed when the run-ways are lowered.

The tubular support 23 extends above the tray element, and keeps the flexible disk 33 from exerting too much pressure on the eggs and chicks, and after the chicks have been hatched there is placed a wooden block in the post when the tray element is lowered to provide a support for the disk 33, at the center of the latter, when shifting the tray element downwardly to accommodate the size of the growth of the chicks.

The manner of setting up the hot water conducting pipes is such whereby the hot water enters the heater element between the outer guide and the body portion of the pan 31, this arrangement allows the warmest water to be carried around the side of the element where the heat radiation is the greatest, and gradually work to the inside where radiation is least, and at a point where the hot water enters the return pipe and is conducted to the water heater. The water guides are of a height as to be spaced from the disk 33 or egg contact member of the combined egg contact and heating element. If the water should cool before it reaches the return pipes by way of the water guides, the cooling will cause it to settle and return directly to the return pipes by passing under the water guides. This arrangement is had to keep the combined egg contacts and heating element as nearly as possible at the same temperature. The contact member, disk 33, comes in direct contact with each egg or chick on the tray and provides for a direct application of heat. As the contact member is flexible it touches every egg at place of contact and like a hen, applies the heat only on top of the egg.

During the first week, after hatching, the device acts as a brooder. The heating element, during such period, is operating at the same temperature it was during the incubation period as the chicks must have access to this heat, the same as the mother hen gives them and as long as the body of the chick requires heat of this source, therefore the device also acts as a brooder.

It is thought that the many advantages of an incubating device, in accordance with this invention can be readily understood, and although the preferred embodiment of the invention is as illustrated and described, yet it is to be understood that changes in the details of construction can be had which will fall within the scope of the invention as claimed.

What I claim is:

1. In an incubator a revolubly supported and vertically adjustable egg tray element, a combined egg contact and heating element arranged in superposed relation with respect to and overlapping the top of said tray element and including a heat conducting bottom for seating directly upon the top of and for applying heat directly to the eggs in the tray element, and said tray element including a tubular support to relieve the pressure of said bottom on the eggs within the tray element.

2. An incubator comprising an egg tray element, a combined egg contacting and heating element arranged over the tray, further overlapping the top of the tray element and having its bottom formed of a heat conducting material and adapted to seat directly upon the top of and apply heat directly to the eggs, said combined egg contacting and heating element provided with spaced water guides, a water heating element arranged to one side of said combined egg contacting and heating element, hot water supply pipes leading from said water heater into said combined contacting and heating element and supported by the water guides therein, and return pipes leading from said combined egg contacting and heating element, supported by the water guides therein and extending to and opening into said water heater.

3. An incubator comprising an egg tray element, a combined egg contacting and heating element arranged over the tray, further overlapping the top of the tray element and having its bottom formed of a heat conducting material possessing a flexible characteristic and adapted to seat directly upon the top of and apply heat directly to the eggs, said combined egg contacting and heating element provided with spaced water guides, a water heating element arranged to one side of said combined egg contacting and heating element, hot water supply pipes leading from said water heater into said combined contacting and heating element and supported by the water guides therein, return pipes leading from said combined egg contacting and heating element supported by the water guides therein and extending to and opening into said water heater, means for revolubly supporting said egg tray element, and said egg tray element provided with a tubular support engaging said bottom for relieving the pressure thereof upon the eggs in the egg tray element.

4. An incubator comprising an egg tray element, a combined egg contacting and heating element arranged over the tray, further overlapping the top of the tray element and having its bottom formed of a heat conducting material possessing a flexible characteristic and adapted to seat directly upon the top of and apply heat directly to the eggs, said combined egg contacting and heating element provided with spaced water guides, a water heating element arranged to one side of said combined egg contacting and heating element, hot water supply pipes leading from said water heater into said combined contacting and heating element and supported by the water guides therein, return pipes leading from said combined egg contacting and heating element supported by the water guides therein and extending to and opening into said water heater, means for revolubly supporting said egg tray element, said egg tray element provided with a tubular support engaging said bottom for relieving the pressure thereof upon the eggs in the egg tray element, and means to provide for the vertical adjustment of the egg tray element relative to said combined egg contacting and heating element.

5. An incubator comprising an egg tray element, a combined egg contacting and heating element arranged over the tray, further overlapping the top of the tray element, provided therein with water guides and having its bottom formed of a heat conducting material and adapted to seat directly upon the top of and apply heat directly to the eggs, a water heater positioned at one side of said combined egg contacting and heating element, hot water supply pipes leading from said water heater into said combined contacting and heating element supported by the water guides therein and extending to and opening into said water heater, means for revolubly supporting said egg tray element, said egg tray element provided with a tubular support engaging said bottom for relieving the pressure thereof upon the eggs in the egg tray element, means to provide for the vertical adjustment of the egg tray element relative to said combined egg contacting and heating element, said combined contacting and heat applying element having a flexible bottom formed of heat conducting material.

In testimony whereof, I affix my signature hereto.

LUTY HAWKINS.